324-77. SR 1-1-74 XR 3,783,413

United States Patent [19]

Froment et al.

[11] 3,783,413

[45] Jan. 1, 1974

[54] N PATH FILTER HAVING TWO INPUT AND N OUTPUT PATHS

[75] Inventors: Jean C. Froment, Villeneuve Loube; Jean L. Monrolin, Tourette/sur/Loup, both of France

[73] Assignee: International Business Machines Corporation, Armonk, N.Y.

[22] Filed: May 10, 1972

[21] Appl. No.: 252,042

[30] Foreign Application Priority Data

May 19, 1971 France .............................. 7119836

[52] U.S. Cl. ................................ 332/23, 324/77 B

[51] Int. Cl. .......................... H03c 3/00, G01r 23/16

[58] Field of Search .......................... 332/23, 22, 48; 324/77 BC, 77 CS, 77 E

[56] References Cited

UNITED STATES PATENTS

| | | | |
|---|---|---|---|
| 3,253,223 | 5/1966 | Kettel | 332/22 X |
| 3,514,719 | 5/1970 | Rhodes | 332/23 |
| 3,045,180 | 7/1962 | Losher | 332/22 X |
| 3,320,552 | 5/1967 | Glasser | 332/23 |

*Primary Examiner*—Alfred L. Brody
*Attorney*—Robert B. Brodie et al.

[57] ABSTRACT

An N path filter where signals are applied to two orthogonal input paths and where the modulated and filtered signals from the input paths are combined and applied to each of the N equiphase output paths, the signals on each output path being suitably modulated, the filter output signal being formed from the algebraic sum of the modulated N output path signals. A pulse approximation to sinusoidal modulating signals is also disclosed.

9 Claims, 13 Drawing Figures

N PATH FILTER HAVING TWO INPUT AND N OUTPUT PATHS

BACKGROUND OF THE INVENTION

This invention relates to narrow band filtering devices and more particularly to N path filters.

The N path filters are formed from a combination of N parallel transmission paths, each path containing a filter connected in series between an input modulator and an output modulator. Such filters enable a filtering of very high quality at relatively low frequencies which required, before the development of N path filters, the use of very accurate magnetic elements or circuits. However, the performance of the N path filters have been, up to now, restricted due to their practical embodiment. In fact, the qualities of such filters are linked to the actual use of a certain number of paths, which involves the use of a plurality of components. In addition, the necessity of having several paths involves an accurate balancing of all these paths, said balancing being very difficult to be obtained due to the possible interactions of the various paths. A detailed study of an N path filter has been published in the "Bell Systems Technical Journal" of September, 1960, pages 1,321–1,350, in an article entitled, "An Alternative Approach to the Realization of Network Transfer Functions The N Path Filter", by L. E. Francks and I. W. Sandberg.

SUMMARY OF THE INVENTION

An object of this invention is to devise an N path filter requiring only a minimum of components. Another object of this invention is to devise a filter with N output paths, but with only two input paths, in which switching devices are substituted for the various modulators.

The N path filter of this invention comprises two orthogonal input paths, each of them including an input modulator and a low pass filter. The input modulation signals are sine waves with the same frequency, but phase shifted of $\pi/2$. The signals supplied by the two input paths are interweighted and intersummed to constitute N output paths. Each output path is modulated by a sinusoidal signal of the same frequency as the input modulation signals, and the various output modulation sinusoidal signals are interphase shifted of a same value. The sum of the signals supplied by the N output paths constitutes the filtered signal. Relatedly, if the sinusoidal modulation can be approximated by a series of square waves, the fundamental component of which is the modulation sinusoidal signal, then the modulator assembly can be replaced by a combination of switching devices.

BRIEF DESCRIPTION OF THE DRAWINGS

FIG. 6b shows the control signals derived from the approximations of FIG. 6a.

DESCRIPTION OF THE PREFERRED EMBODIMENTS

Figure 1:
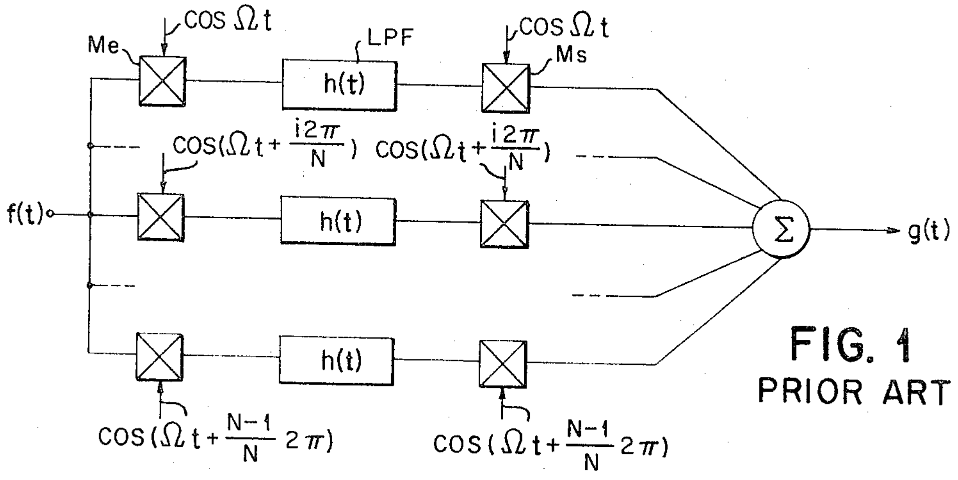
FIG. 1 PRIOR ART
FIG. 1 schematically shows an N path filter according to the prior art.
Figure 2:
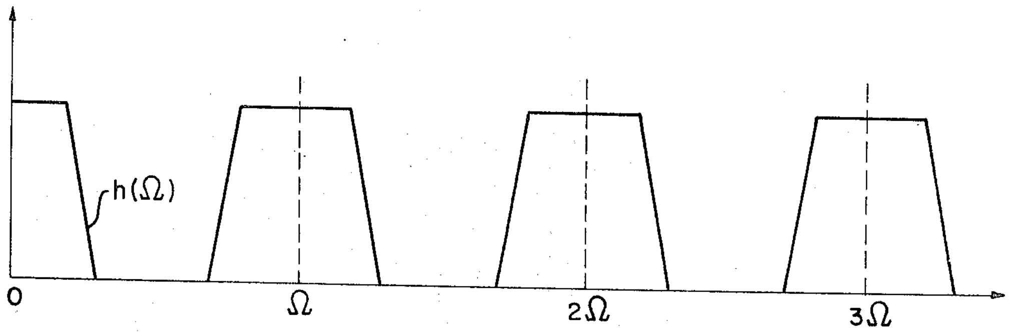
FIG. 2 shows the spectrum of the frequencies of the filter shown in FIG. 1.

Referring now to FIG. 1, there is schematically shown an N path filter using sinusoidal modulation according to the prior art. The input signal to be filtered is applied in parallel to the N path assembly. Each path includes an input modulator Me, an impulse response $h(t)$, low pass filter LPF and an output modulator Ms. The modulators of a same path are controlled by a sinusoidal modulation signal which can be expressed as follows: cos $(\Omega t + i2\pi/N)$ in which N is the number of paths of the N path filter and $i$, a whole number taking the following values $i=0, 1, \ldots, (N-1)$. The filtered output signal is obtained by summing the signals delivered by the N paths. The N path filter exhibits a periodic frequency spectrum called a "comb spectrum" as shown in FIG. 2. A conventional filter located at the output of the N path filter enables one to isolate the chosen part of the spectrum.

Generally, if $f(t)$ is the signal applied to the input of the N path filter, this signal is divided by the input modulators of the N paths, into N components at frequency $\Omega/2\pi$, these components being interphase-shifted by the value $2\pi/N$. This division is obtained by using input modulators. In the index i path, the input modulator modulates signal $f(t)$ with signal cos $(\Omega t + i2\pi/N)$. This modulator supplies a continuous component corresponding to the presence, in signal $f(t)$, of a component at frequency $\Omega/2\pi$ and of phase $i2\pi/N$, and of components at high frequencies. The high frequency components are eliminated through low pass filters and the final recombination of the signals supplied by the N paths. Each component is filtered by the low pass filter of the corresponding path, and then said component is remodulated by the same sinusoidal signal in the output modulator. This is to completely eliminate the harmonic frequencies created by the input modulation. The N separate components are then recombined by an output summing device which supplies filtered signal $f(t)$ which is referenced $g$ $(t)$.

Let $g_i$ $(t)$ be the signal supplied by the index $i$ path, this signal is given by the following relation:

$$g_i(t) = [(f(t)\cos(\Omega t + i2\pi/N)) \otimes h(t)]\cos(\Omega t + i2\pi/N)$$

where $\otimes$ is the convolution operator.

Signal $g(t)$ is given by the following relation:

$$g(t) = \sum_{i=0}^{N-1} g_i(t)$$

$$g(t) = \sum_{i=0}^{N-1}\left[\left(\left(f(t)\cos\left(\Omega t + \frac{i2\pi}{N}\right)\right)\otimes h(t)\right)\cos\left(\Omega t + \frac{i2\pi}{N}\right)\right] \quad (1)$$

Figure 3:
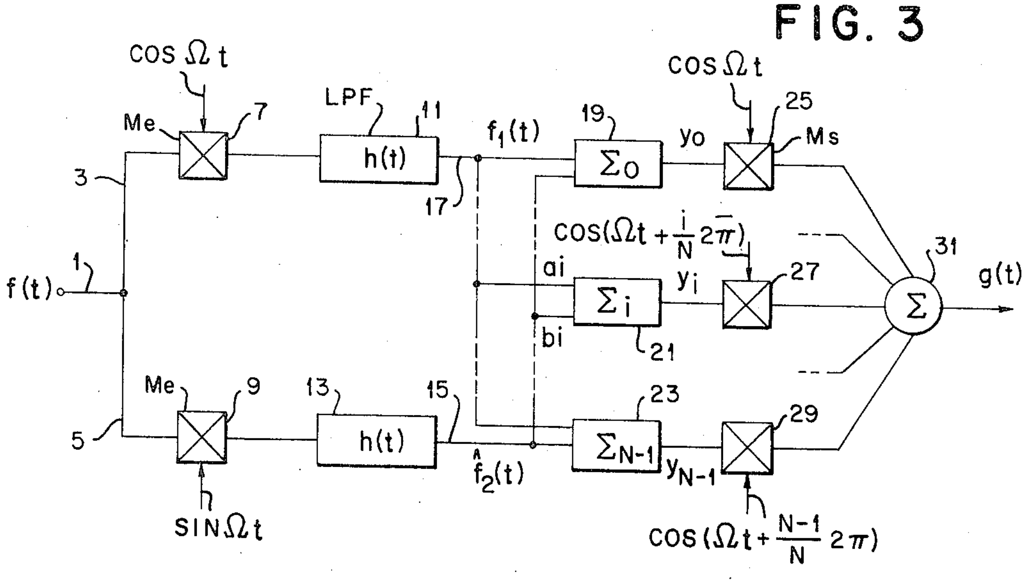
FIG. 3 schematically shows an N path filter according to this invention.

Referring now to FIG. 3, there is schematically shown an N path filter according to this invention. In contrast, in the invention, the input signal to be filtered $f(t)$ is applied in parallel to two input paths at input 1. The first input path 3 includes an input modulator ($Me$) 7, the modulation signal of which is a sinusoidal signal which can be represented by cos $\Omega t$, and an impulse response $h(t)$ low pass filter LPF 11. The second input path 5 includes an input modulator ($Me$) 9 the modulation signal of which has the same frequency as the modulation signal of the input modulator ($Me$) 7 of the first path. However, modulator 9 is in quadrature with this last modulation signal. In this example, the modulation signal of the second input path may be represented by sin $\Omega t$. The second input path includes, in addition, an impulse response $h(t)$ low pass filter 13.

The two input paths divide input signal $f(t)$ into two components $f_1(t)$ and $f_2(t)$ in quadrature. The signals $f_1(t)$ and $f_2(t)$ are intercombined in summing devices 19, 21, and 23 ( o, 1, . . . i . . . N-1) which are the respective first elements of the corresponding N output paths. These summing devices supply weighted sums of signals $f_1(t)$ and $f_2(t)$ with $a_i$ and $f_i$ as respective weights.

Summing device i supplies a signal $y_i(t)$ given by the following relation:

$$y_i(t) = a_i f_1(t) + b_i f_2(t) \qquad (2)$$

It should be noted that the outputs of these two impulse response $h(t)$ low pass filters 11 and 13 should never interfere. If these low pass filters have a low output impedance, this interference does not appear. Even if these low pass filters have a high output impedance, an isolating circuit can be used. One example of such an isolation circuit is a single emitter follower transistor.

Signal $Y_i(t)$ in the $i^{th}$ path is modulated by a signal of the form cos $(\Omega t + i2\pi/N)$ by product modulator 27 to form $g_i(t)$. The recombination of $g_i(t)$ of each of the N output paths at network 31 forms the output signal $g(t)$. Let us analyze the output of each of the summing devices. First, the orthogonal signals $f_1(t)$ and $f_2(t)$ are given by the following relations:

$$f_1(t) = (f(t).\cos\Omega t)\otimes h(t)$$
$$f_2(t) = (f(t).\sin\Omega t)\otimes h(t) \qquad (3)$$

By giving the following values:

$$a_i = \cos i2\pi/N$$
$$b_i = -\sin i2\pi/N \qquad (4)$$

to $a_i$ and $b_i$, then according to relation (2), $y_i(t)$ becomes:

$$y_i(t) = f_1(t)\cos(i2\pi/N) - f_2(t)\sin(i2\pi/N)$$

which yields, by replacing $f_1(t)$ and $f_2(t)$ by their values taken from relation (3):

$y_i(t) = [(f(t)\cos\Omega t)\otimes h(t)]\cos i2\pi/N - [(f(t)\sin\Omega t)\otimes h(t)]\sin i2\pi/N$ This relation reduces to:

$y_i(t)=[f(t)(\cos(\Omega t)\cos(i2\pi/N) - \sin(\Omega t)\sin(i2\pi/N))]\otimes h(t)$ Recalling the trigonometric identity $\cos(m\pm n) = \cos m \cos n \mp \sin m \sin n$ then $y_i(t) = [f(t)\cos(\Omega t + i2\pi/N)]\otimes h(t)$.

Signal $g_i(t)$ supplied by the index i output path is given by the following formula:

$$g_i(t) = y_i(t)\cos(\Omega t + i2\pi/N)$$

Signal $g(t)$ is given by the following formula:

$$g(t) = \sum_{i=0}^{N-1} g_i(t)$$

$$g(t) = \sum_{i=0}^{N-1}\left[\left(\left(f(t)\cos\left(\Omega t + \frac{i2\pi}{N}\right)\right)\otimes h(t)\right)\cos\left(\Omega t + \frac{i2\pi}{N}\right)\right] \qquad (5)$$

Relation (1) gives the expression of filtered signal $g(t)$ in the case of a conventional N path filter, and relation (5) gives the expression of the filtered signal in the case of the N path filter of this invention. These are identical.

Therefore, the N path filter of this invention shows exactly the same characteristics as the conventional N path filter.

While the conventional N path filter requires the use of 2N modulators and N low pass filters, the filter of this invention requires only $N+2$ modulators and two low pass filters. The number of modulators always necessary and the summing device assembly can be reduced, in fact, by working on the modulation signals and more particularly by approaching the sinusoidal modulation by a square wave modulation. This approximation is made easier by the fact that the N path filter, whether it be conventional or as described in this invention, is followed by a low pass filter to separate the necessary part of the spectrum, said spectrum being periodical as shown in FIG. 2.

In a first approach, the modulation signals of the two input paths, cos $\Omega$t and sin $\Omega$t, can be replaced by bipolar square waves as they appear in FIG. *4a*. Signals $\theta 1$–$\theta 2$ and $\theta 3$–$\theta 4$ have cos $\Omega$t and sin $\Omega$t as respective fundamental components. This modulation is simply carried out by allowing the signal to be filtered to pass, for example, during the time corresponding to $\theta 1$ and its reciprocal during the time corresponding to $\theta 2$, and similarly for the modulation by signal $\theta 3$–$\theta 4$.

Referring now to FIGS. *5a* and *5b*, there is shown another embodiment of the invention. In these figures, the input modulators 7 and 9 each comprise two switches and one inverter. Modulator 7 consists of switches S1 and S10 and inverter 4. The inverter provides the 180° phase shift of the input signal gated through to filter 11. Similarly, inverter 6 provides the $\pi$ radians phase shift for the input signal applied to switch S12. The embodiment in FIG. *5b* differs from that shown in FIG. *5a* only in that inverters 4 and 6 have been replaced by a common inverter 8 and electrical connection.

Control signals $\phi 1$, $\overline{\phi 1}$, $\phi 2$ and $\overline{\phi 2}$ of the various switches are shown in FIG. *4b*. With such control signals, switches S1 and S2 on the one hand, and S10 and S12 on the other hand, will conduct during common time intervals. These are shown as hachured areas in control signals $\phi 1$ and $\phi 2$ on the one hand and $\overline{\phi 1}$ and $\overline{\phi 2}$ on the other hand, in FIG. *4b*. During these common time intervals, the two input paths are directly interconnected, said interconnection should be avoided. This avoidance is attained by approaching the input modulation signals, by the three level signals as they appear in FIG. *4c*. These three level signals have always cos $\Omega$t and sin $\Omega$t as respective fundamental components.

Figures 4A, 4B, 4C, 4D:
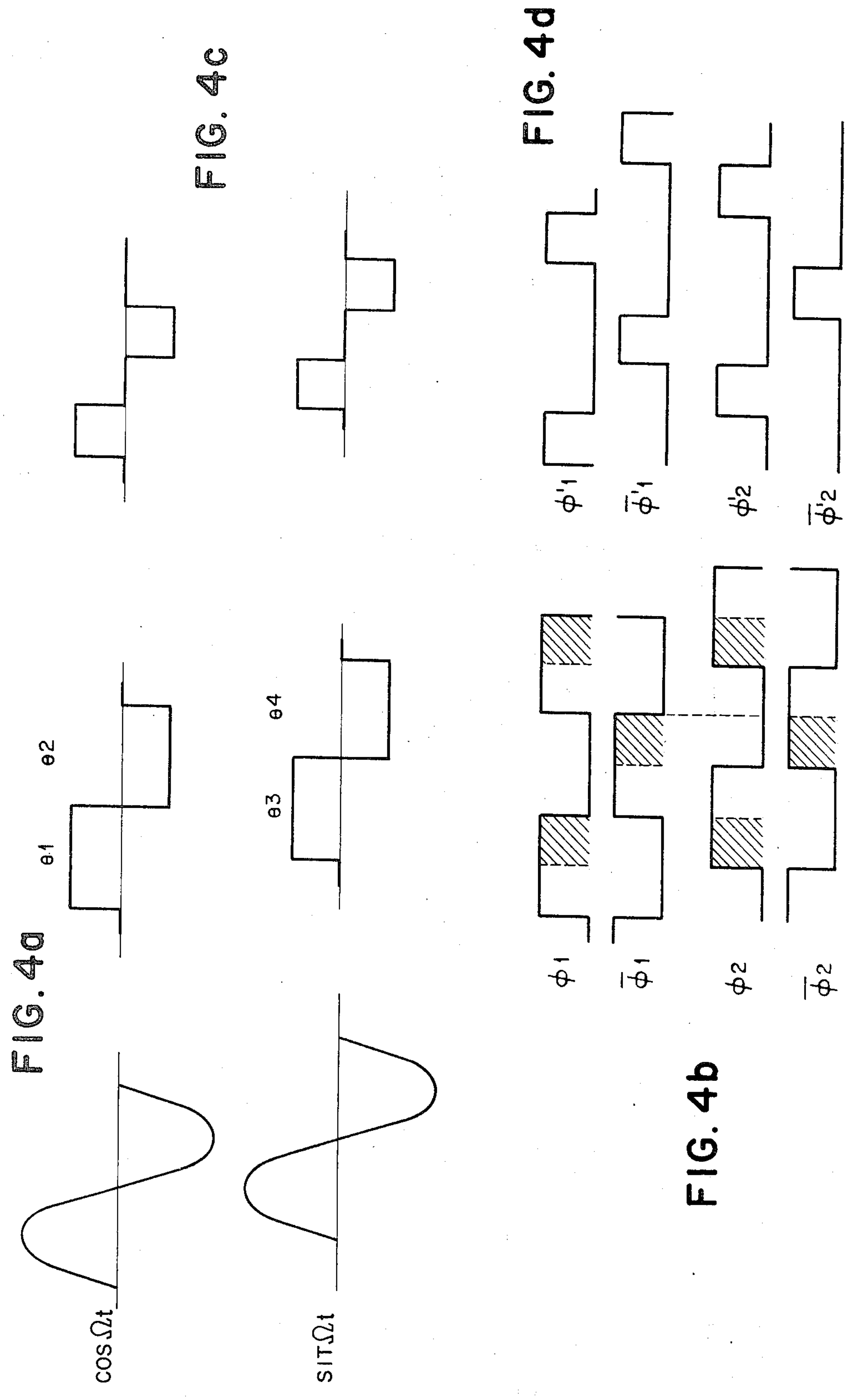
FIGS. 4a and 4c show two approximations of the sinusoidal modulation signals.
FIGS. 4b and 4d respectively, show the control signals derived from the approximation of FIGS. 4a and 4c.
Figure 5A:
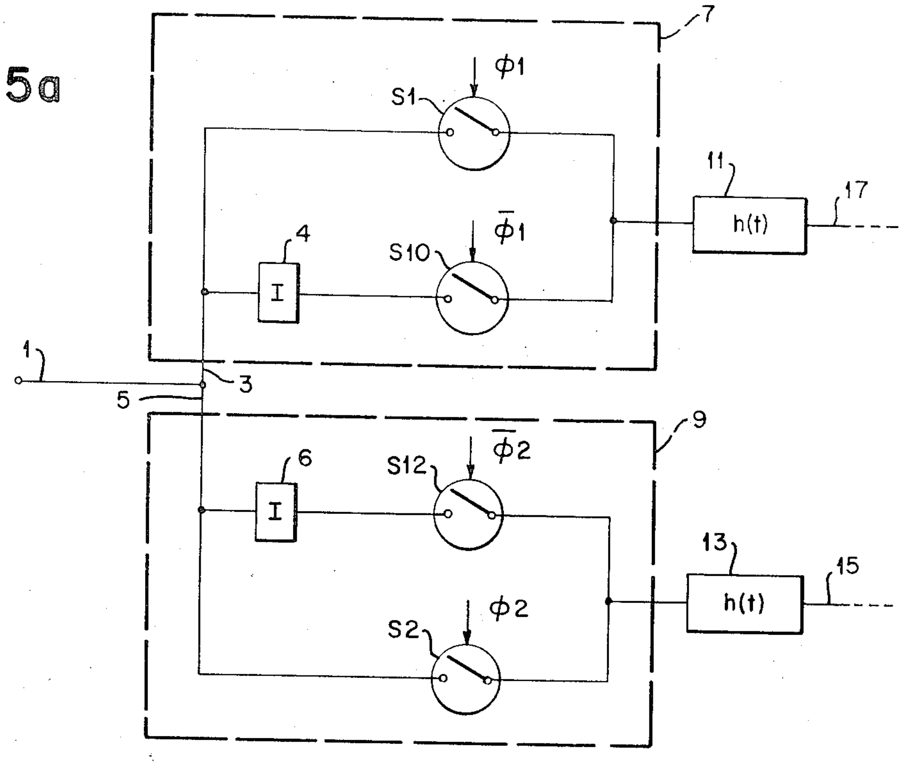
FIGS. 5a and 5b show two embodiments of the two input paths of the N path filter according to this invention.
Figure 5B:
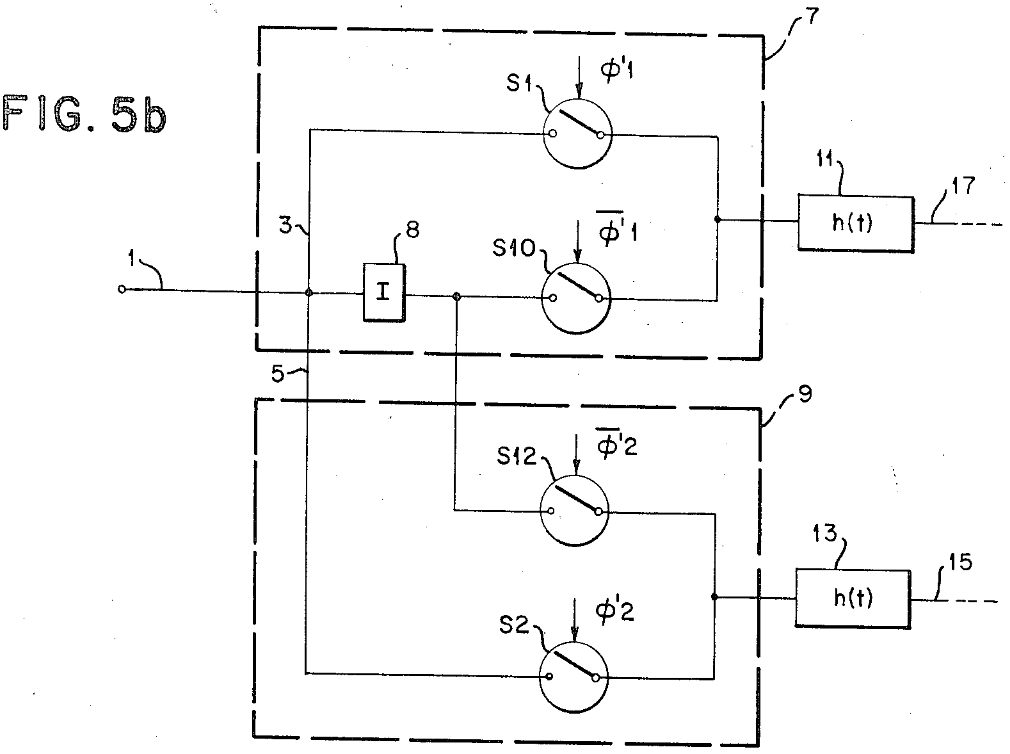

The control signals of switches S1, S10, S2 and S12, referenced in $\phi 1'$, $\bar{\phi}1'$, $\phi 2$ and $\bar{\phi}'2$ are represented in FIG. 4*b*. With the control signals shown in FIG. 4*d*, no switch conducts at the same time, and both inverters 4 and 6 may be replaced by a single inverter 8 without any connection appearing between the two input paths. Then, the two input paths appear as shown in FIG. 5*b*.

The approach carried out up to now, for the input modulation signals may also be used for the output modulation signals.

For example, let us consider the case of a three output path filter.

In this case, the output modulation signals are cos $\Omega t$; cos $(\Omega t+2\pi/3)$; cos $(\Omega t+4\pi/3)$.

Figure 6A:
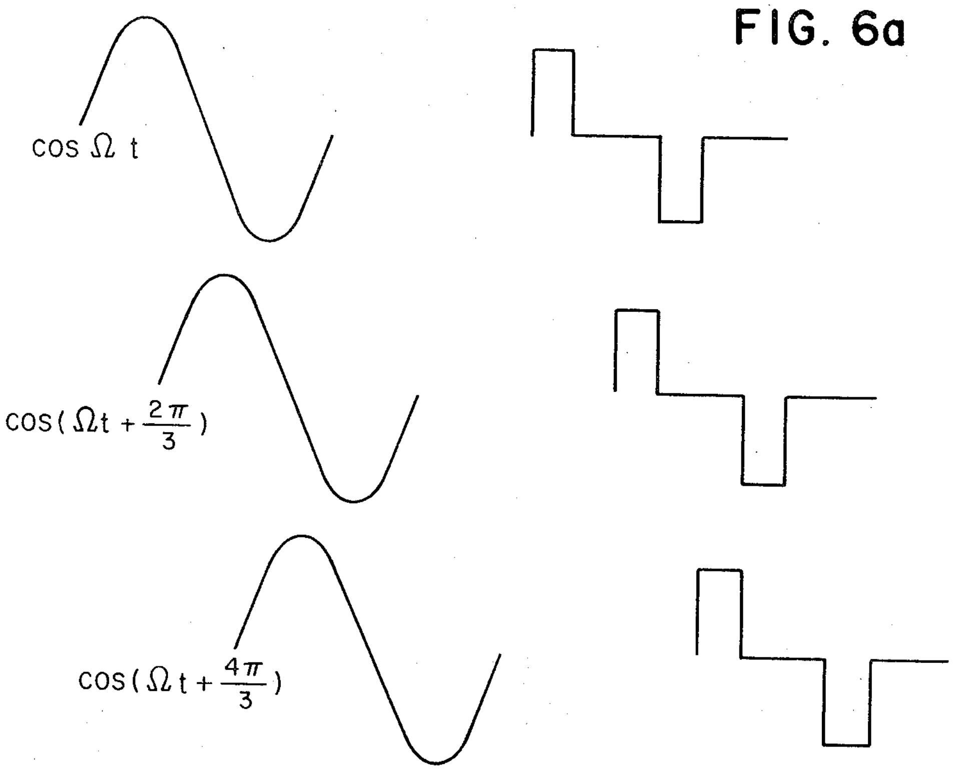
FIG. 6a shows an approximation of the output modulation signals in an example of a three path filter according to this invention.
Figure 6B:
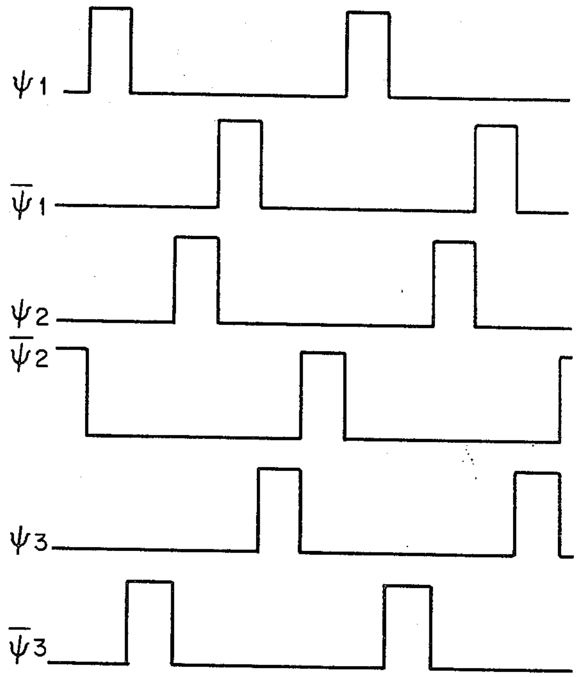

These output modulation signals are approached by the three level signals shown in FIG. 6*a*, and the corresponding switch control signals are shown in $\phi 1$, $\phi 1$, $\phi 2$, $\phi 2$, $\phi 3$ and $\phi 3$, in FIG. 6*b*.

In this example, the weighting factors are obtained by applying N=3 and by varying *i* from 0 to 2 in formula (3).

The following is obtained $$a_0=1 \quad a_1=-\tfrac{1}{2} \quad a_2=-\tfrac{1}{2}$$

$$b_0=0 \quad b_1=-\sqrt{3}/2 \quad b_2=\sqrt{3}/2$$

Figure 7A:
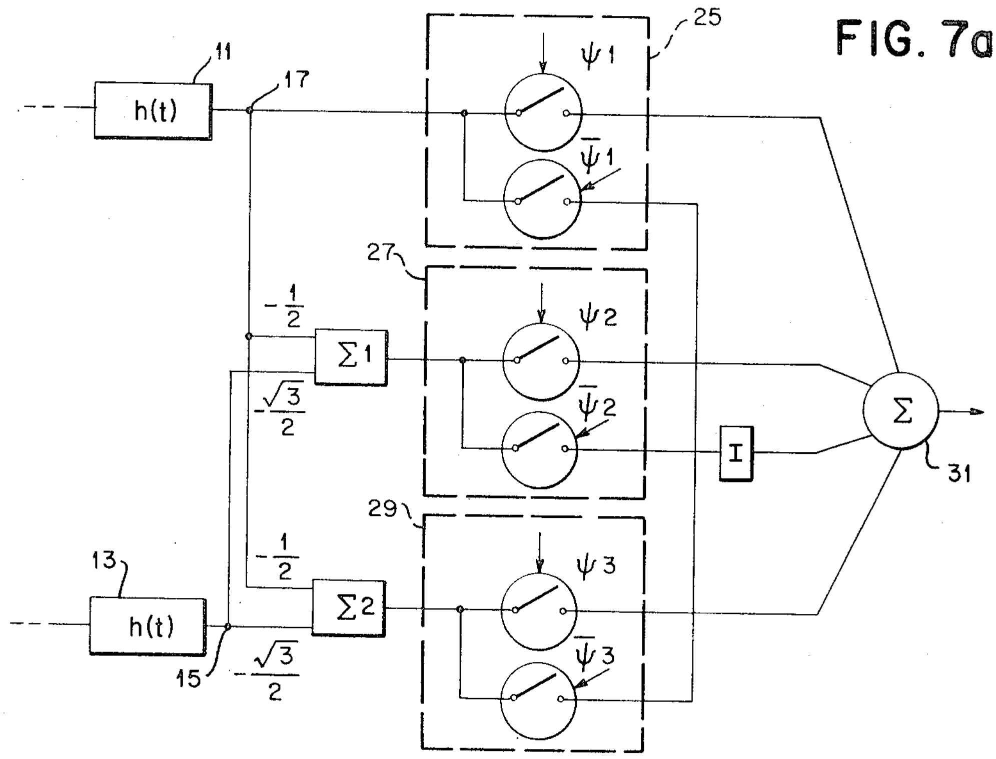
FIGS. 7a and 7b show two embodiments of the three output paths of an example of a three path filter according to this invention.

The three output paths appear as shown in FIG. 7*a*.

In fact, this configuration can be more simplified by noting that, always taking into account the low output impedance of the low pass filters and the fact that no switch conducts at the same time, summing devices 241 and 2, inverter I and output summing device 24 may be obtained by using a single operational amplifier.

Figure 7B:
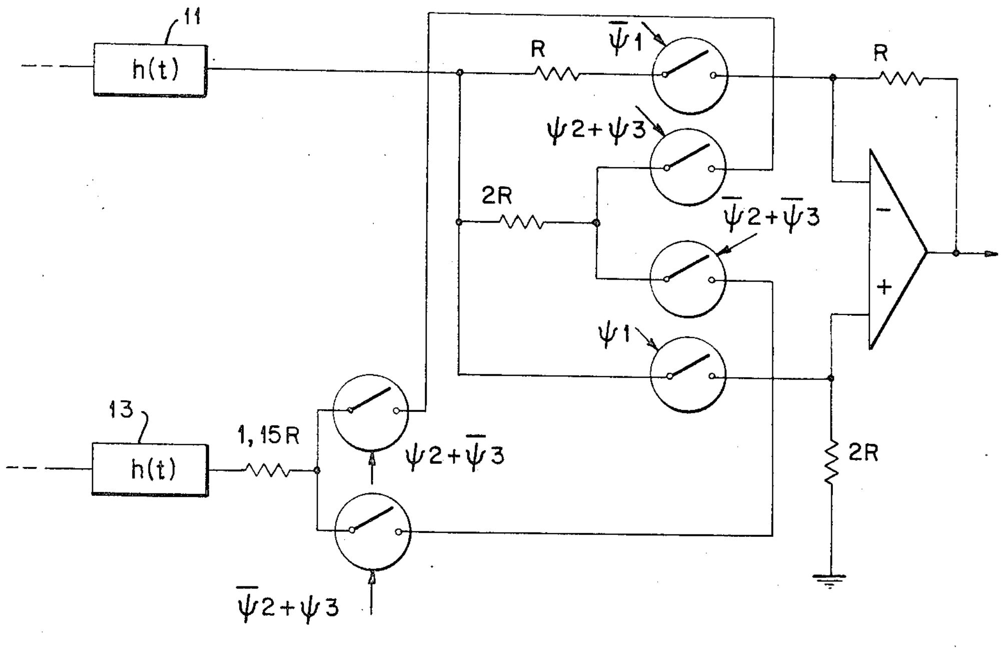

An example of such an embodiment is shown in FIG. 7*b*.

Therefore, a three path filter of this invention requires the use of two low pass filters, two operational amplifiers and ten switches while a conventional three path filter requires the use of three low pass filters, six modulators and a summing device.

For a better understanding of the invention, an example of a three output path filter has been described, but it is obvious that the teachings of this invention may be applied to N output paths.

In the case of N output paths, the signals approaching the output sinusoidal modulations are constituted by an alternating succession of positive and negative pulses of a duration of 1/2N period of the sinusoidal signal they approach, and separated by N-1/2N period of this same signal they approach.

While there has been described what is, at present, considered to the preferred embodiment of the invention, it will be understood that various modifications may be made therein and it is intended to cover in the appended claims all such modifications as fall within the true spirit and scope of the invention.

What is claimed is:

1. An N path filter comprising:

two orthogonal input paths receiving in parallel, the input signal to be filtered;

N equiphase output paths obtained by combining both input paths; and a final summation device carrying out the sum of N output paths and providing the filter output signal;

each input path comprises:

an input modulator the modulation signal of which is sinusoidal, the modulation signals of both input modulators being in quadrature, and a low pass filter;

each output path includes:

a summation device supplying the sum of the signals supplied by both input paths provided with weighting factors, and an output modulator, the modulation signal of which is sinusoidal, and has the same frequency as the modulation signals of the input modulators, the modulation signals of the various output modulators being phase shifted by an equal value.

2. An N path filter of claim 1, wherein the weighting factor of the signals supplied by an input path and enabling to obtain a certain output path represents the projection of the modulation signal of this output path with respect to the modulation signal of this input path.

3. An N path filter of claim 2, wherein the modulation signals of the input modulators are approximated by an alternating succession of positive and negative pulses of a duration of one quarter of the period of the sinusoidal modulation signals they approach and separated by a quarter of the period of the sinusoidal modulation signals they approach, the alternating successions of positive and negative pulses of the two input paths being in quadrature; and wherein each input modulator includes a first and a second input switching device, the outputs of which are connected in parallel to the low pass filter of the corresponding input path, the first input switching device receiving the input signal to be filtered and the second input switching device receiving the reciprocal of the input signal to be filtered, the positive and negative pulses controlling the closing of the first and second switching devices respectively.

4. An N path filter of claim 3 characterized in that it includes an input inverter receiving the input signal to be filtered, and the output of which is connected in parallel to the second input switching devices of the first and second input paths.

5. An N path filter of anyone of claim 1, wherein the modulation signals of the output modulators are approximated by an alternating succession of positive and negative pulses of a duration of 1/2N periods of the sinusoidal modulation signals and separated by N-1/2N periods of the sinusoidal modulation signal, the alternating successions of positive and negative pulses of the various output paths being phase shifted of an equal value, and in that each output modulator includes a first and a second output switching device, the outputs of which are interconnected, the output of the first output switching device being directly connected to the final summing device and the reversed output of the second output switching device being connected to the final summing device, the positive and negative pulses controlling the closing of the first and second switching devices respectively.

6. An N path filter of claim 4, wherein the filter also includes an output inverter receiving, in parallel, the outputs of the second output switching devices of N output paths, the output of which is directly connected to the final summing device.

7. An N path filter comprising:

means (7, 9, 11, 13, 15, 17) for generating a pair of time varying orthogonal signals $f_1(t)$ and $f_2(t)$ responsive to the application of a continuous time varying signal f(t) said means include:

means (7, 9) for modulating the applied signal $f(t)$ with a carrier of frequency $\Omega$ radians per second in quadrature, thereby yielding the signals $f(t)\cos(\Omega t)$ and $f(t)\sin(\Omega t)$; and Filter means (11, 13) having a time domain impulse response $h(t)$ convolvable with the quadrature signals in order to obtain the orthogonal signals $f_1(t)$ and $f_2(t)$ wherein $f_1(t) = [f(t)\cos(\Omega t)]\otimes h(t)$ $f_2(t) = [f(t)\cos(\Omega t)]\otimes h(t)$; $\otimes$ being the convolution operator;

N equiphase paths (19, 25; 21, 27; 23, 29), each path being responsive to the pair of orthogonal signals and having means (21, 27) for forming an output signal element $g_i(t)$ according to the relation:

$g_i(t) = [a_i f_1(t)+b_i f_2(t)]\cos(\Omega t+i2\pi/N)$; $a_i$ and $b_i$ being constant phase elements such that $a_i = \cos(i2\pi/N)$ and $b_i=-\sin(i2\pi/N)$, which relation $g_i(t)$ upon substitution thereinto reduces to:

$g_i(t)=[f(t)\cos(\Omega t+i2\pi/N)\otimes h(t)]\cos(\Omega t+i2\pi/N)$; and means (31) for forming the filter output signal $g(t)$ by algebraically combining the elemental output signals $g_i(t)$ such that $$g(t)=\sum_{i=0}^{N-1} g_i(t).$$

8. An N path filter according to claim 7, wherein: $h(t)$ is the filter impulse response of the form $h(t) = Ae^{-\alpha t}\sin(\Omega t)$ in which A is the relative magnitude, $\alpha$ is the inverse filter time constant.

9. An N path filter according to claim 7 wherein the means for generating a pair of orthogonal signals includes means for approximating the $f(t)\cos(\Omega t)$ and $f(t)\sin(\Omega t)$ terms by the respective multiplication of $f(t)$ by a predetermined number of uniform pulses in fixed phase and time relation.

* * * * *